(12) United States Patent
Kim et al.

(10) Patent No.: US 11,133,553 B2
(45) Date of Patent: Sep. 28, 2021

(54) BATTERY PACK

(71) Applicant: SAMSUNG SDI CO., LTD., Yongin-si (KR)

(72) Inventors: Junseop Kim, Yongin-si (KR); Iloh Kang, Yongin-si (KR); Deayon Moon, Yongin-si (KR); Minuk Woo, Yongin-si (KR); Wonil Lee, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 24 days.

(21) Appl. No.: 16/480,130

(22) PCT Filed: Nov. 2, 2017

(86) PCT No.: PCT/KR2017/012305
§ 371 (c)(1),
(2) Date: Jul. 23, 2019

(87) PCT Pub. No.: WO2018/139739
PCT Pub. Date: Aug. 2, 2018

(65) Prior Publication Data
US 2019/0341590 A1    Nov. 7, 2019

(30) Foreign Application Priority Data

Jan. 26, 2017    (KR) .................... 10-2017-0012973

(51) Int. Cl.
*H01M 50/20* (2021.01)
*H01M 50/24* (2021.01)
(Continued)

(52) U.S. Cl.
CPC ........... *H01M 50/20* (2021.01); *H01M 50/24* (2021.01); *H01M 50/204* (2021.01); *H01M 50/249* (2021.01); *H01M 2220/20* (2013.01)

(58) Field of Classification Search
None
See application file for complete search history.

(56) References Cited

U.S. PATENT DOCUMENTS

| 4,965,148 | A | * | 10/1990 | Daio | ..................... | H01M 2/105 |
|           |   |   |         |      |                      | 29/623.1   |
| 9,130,224 | B2 |  | 9/2015  | Lee et al. | | |

(Continued)

FOREIGN PATENT DOCUMENTS

| CN | 102110797 A | 6/2011 |
| CN | 204966567 U | 1/2016 |

(Continued)

OTHER PUBLICATIONS

Machine translation of JP2012124131A originally published to Honjo et al. on Jun. 28, 2012. (Year: 2012).*

(Continued)

*Primary Examiner* — Milton I Cano
*Assistant Examiner* — Andrew J Miller
(74) *Attorney, Agent, or Firm* — Lee IP Law, P.C.

(57) ABSTRACT

Provided is a battery pack with an improved sealing force, the battery pack including: a lower case having a space therein and having a groove portion formed to extend along a certain width of an outer top surface; an upper case arranged on the lower case; a battery unit accommodated in an internal space of the lower case and including a plurality of battery cells; and a sealing member inserted into the groove portion to be located between the upper case and the lower case, wherein a cross-sectional shape thereof has an upper surface, a lower surface, and a side surface connecting the upper surface to the lower surface, the upper surface is formed as a curved surface convexed toward the upper case, and a protrusion portion forming a step with the upper surface is located at the side surface.

16 Claims, 6 Drawing Sheets

(51) Int. Cl.
  *H01M 50/204* (2021.01)
  *H01M 50/249* (2021.01)

(56) References Cited

U.S. PATENT DOCUMENTS

| | | |
|---|---|---|
| 9,338,910 B2 | 5/2016 | Hattori |
| 9,466,819 B2 | 10/2016 | Lim |
| 2008/0286641 A1 | 11/2008 | Yonishi |
| 2009/0162732 A1 | 6/2009 | Noblet et al. |
| 2011/0133409 A1 | 6/2011 | Shibuya |
| 2013/0242477 A1 | 9/2013 | Hattori |

FOREIGN PATENT DOCUMENTS

| | | |
|---|---|---|
| CN | 205248331 U | 5/2016 |
| CN | 205542939 U | 8/2016 |
| CN | 106410075 A | 2/2017 |
| EP | 2 355 206 A1 | 8/2011 |
| EP | 2 640 174 A2 | 9/2013 |
| JP | 10-059220 A | 3/1998 |
| JP | 2011-194982 A | 10/2011 |
| JP | 2012-124131 A | 6/2012 |
| JP | 2012124131 A * | 6/2012 |
| JP | 2013-197137 A | 9/2013 |
| JP | 2015-153502 A | 8/2015 |
| KR | 10-1182867 B1 | 9/2012 |
| KR | 10-2016-0116566 A | 10/2016 |
| KR | 10-1678530 B1 | 11/2016 |

OTHER PUBLICATIONS

International Search Report and Written Opinion for PCT/KR2017/012305 filed on Nov. 2, 2017.
Societe Pour L'importation et la Manufacture D'articles En Caoutchouc:"Articles Pour Industrie Bagues,joints,cylindres Plaques,tapis caoutchouc Feuilles, rouleaux Articles Sanitaires Caoutchoucs moules extrudes Caoutchouc naturel Caoutchouc synthetique Fluores,viton,etc.Silicone", Dec. 31, 2014.
Partial Supplementary European Search Report dated Oct. 13, 2020 for corresponding European Patent Application No. 17894347.8.
Extended European Search Report dated Mar. 23, 2021 for corresponding EP Patent Application No. 17894347.8.
Korean Office action dated May 17, 2021 for corresponding KR Patent Application No. 10-2017-0012973.
Chinese Office action dated Jul. 20, 2021 for corresponding application CN 201780084775.3.

* cited by examiner

BATTERY PACK

CROSS-REFERENCE TO THE RELATED APPLICATION

This is the U.S. national phase application based on PCT Application No. PCT/KR2017/012305, filed Nov. 2, 2017, which is based on Korean Patent Application No. 10-2017-0012973, filed Jan. 26, 2017, the entire contents of all of which are hereby incorporated by reference.

TECHNICAL FIELD

The present disclosure relates to a battery pack with an improved sealing force.

BACKGROUND ART

In general, secondary batteries are rechargeable, unlike primary batteries. Secondary batteries may be used as energy sources for mobile devices, electric vehicles, hybrid vehicles, electric bicycles, uninterruptible power supplies, or the like, and depending on the types of external devices to which they are applied, the secondary batteries may be used in the form of a single battery or in the form of a battery module in which a plurality of batteries are connected and combined into one unit.

A small mobile device such as a mobile phone may operate for a certain time according to the output and capacity of a single battery; however, in the case of long-time driving or high-power driving such as in the case of an electric vehicle or a hybrid vehicle with high power consumption, a battery module including a plurality of batteries may be preferred due to output and capacity issues, and the battery module may increase the output voltage or the output current according to the number of built-in batteries.

DESCRIPTION OF EMBODIMENTS

Technical Problem

Provided is a structure of a battery pack with an improved sealing force.

Solution to Problem

According to an aspect of the present disclosure, a battery pack includes: a lower case having a space therein and having a groove portion formed to extend along a certain width of an outer top surface; an upper case arranged on the lower case; a battery unit accommodated in an internal space of the lower case and including a plurality of battery cells; and a sealing member inserted into the groove portion to be located between the upper case and the lower case, wherein a cross-sectional shape thereof has an upper surface, a lower surface, and a side surface connecting the upper surface to the lower surface, the upper surface is formed as a curved surface convexed toward the upper case, and a protrusion portion forming a step with the upper surface is located at the side surface.

According to the present embodiment, an insertion groove located to correspond to the protrusion portion of the sealing member may be formed at an inner surface of the groove portion.

According to the present embodiment, the upper surface of the sealing member may be pressed by the upper case to contact the upper case.

According to the present embodiment, when the upper case presses the sealing member, the protrusion portion of the sealing member may be coupled to the insertion groove of the groove portion.

According to the present embodiment, a width of the cross-sectional shape of the sealing member may decrease gradually from the protrusion portion toward the lower surface.

According to the present embodiment, the sealing member may include a polarity indication tab and a connection portion connecting the polarity indication tab to the sealing member.

According to the present embodiment, the polarity indication tab may have one surface and another surface opposite to the one surface, and the polarity may be indicated only on the one surface.

According to the present embodiment, the groove portion may have a fitting groove opened to an internal space of the lower case, and the polarity indication tab may be fixed to the fitting groove by inserting the connection portion into the fitting groove.

According to the present embodiment, the fitting groove may include a first fitting groove and a second fitting groove, the polarity indication tab may include a first polarity indication tab and a second polarity indication tab that have different polarities, the first polarity indication tab may be fixed to the first fitting groove, and the second polarity indication tab may be fixed to the second fitting groove.

According to the present embodiment, the sealing member may further include a projection portion.

According to the present embodiment, the groove portion may further include a projection accommodating portion for accommodating the projection portion.

According to the present embodiment, the projection portion may be located adjacent to the second polarity indication tab.

According to the present embodiment, the sealing member may have a closed-loop shape.

According to the present embodiment, the groove portion may include a first partition wall located adjacent to an internal space of the lower case and a second partition wall located adjacent to the outside of the lower case, and a height of the first partition wall may be greater than a height of the second partition wall with respect to a bottom portion of the groove portion.

Advantageous Effects of Disclosure

As described above, according to an embodiment of the present disclosure, a battery pack with an improved sealing force may be implemented. However, the scope of the present disclosure is not limited to these effects.

Also, the effects of the present disclosure may be derived from the following description with reference to the drawings, in addition to the above description.

MODE OF DISCLOSURE

Figure 1:
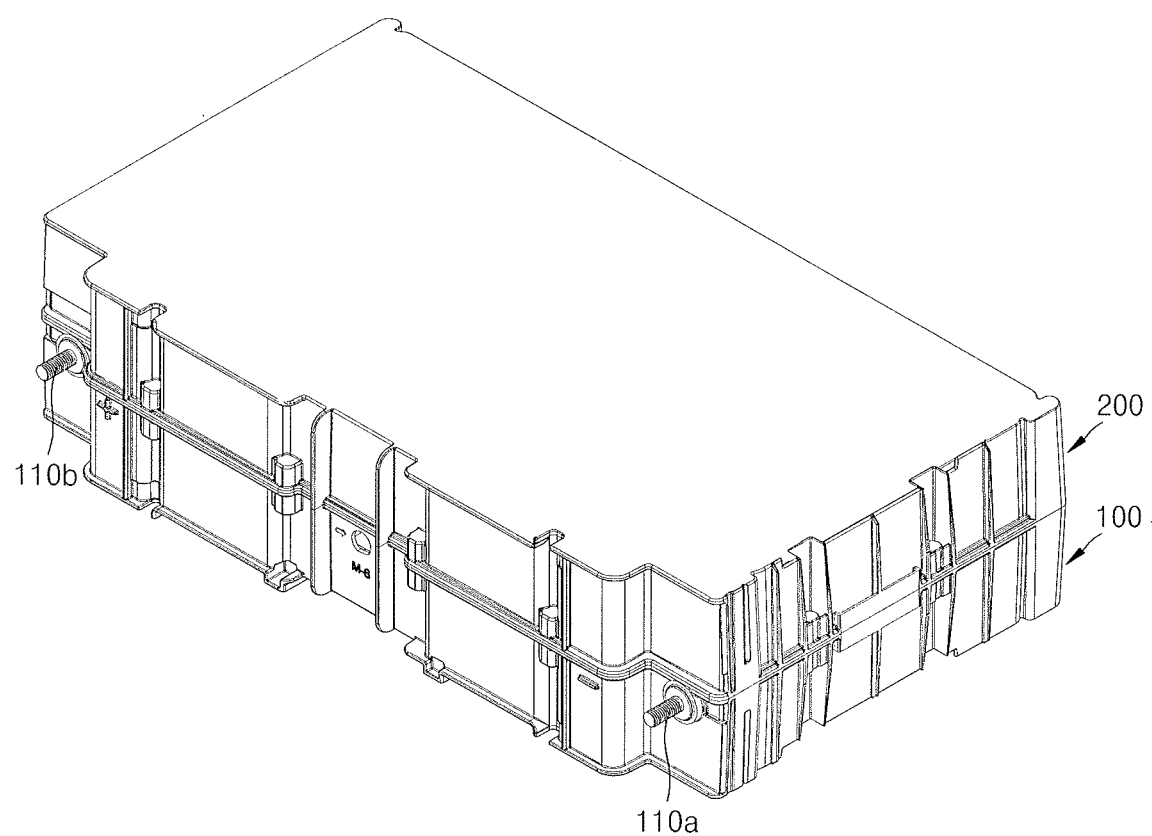
FIG. 1 is a perspective view schematically illustrating a battery pack according to an embodiment of the present disclosure.

The present disclosure may include various embodiments and modifications, and certain embodiments thereof are illustrated in the drawings and will be described herein in detail. The effects and features of the present disclosure and the accomplishing methods thereof will become apparent from the following description of the embodiments taken in conjunction with the accompanying drawings. However, the present disclosure is not limited to the embodiments described below, and may be embodied in various modes.

Hereinafter, embodiments of the present disclosure will be described in detail with reference to the accompanying drawings, and in the following description, like reference numerals will denote like elements and redundant descriptions thereof will be omitted.

It will be understood that although the terms "first", "second", etc. may be used herein to describe various components, these components should not be limited by these terms and these terms are only used to distinguish one component from another component.

As used herein, the singular forms "a", "an", and "the" are intended to include the plural forms as well, unless the context clearly indicates otherwise.

It will be understood that the terms "comprise", "include", and "have" used herein specify the presence of stated features or components, but do not preclude the presence or addition of one or more other features or components.

It will be understood that when a layer, region, or component is referred to as being "located on" another layer, region, or component, it may be "directly" or "indirectly" located on the other layer, region, or component, that is, for example, one or more intervening layers, regions, or components may be located therebetween.

In the following embodiments, the x-axis, the y-axis, and the z-axis are not limited to three axes of the rectangular coordinate system, and may be interpreted in a broader sense. For example, the x axis, the y axis, and the z axis may be perpendicular to each other, or may represent different directions that are not perpendicular to each other.

Sizes of components in the drawings may be exaggerated for convenience of description. In other words, since the sizes and thicknesses of components in the drawings are arbitrarily illustrated for convenience of description, the present disclosure is not limited thereto.

Figure 2:
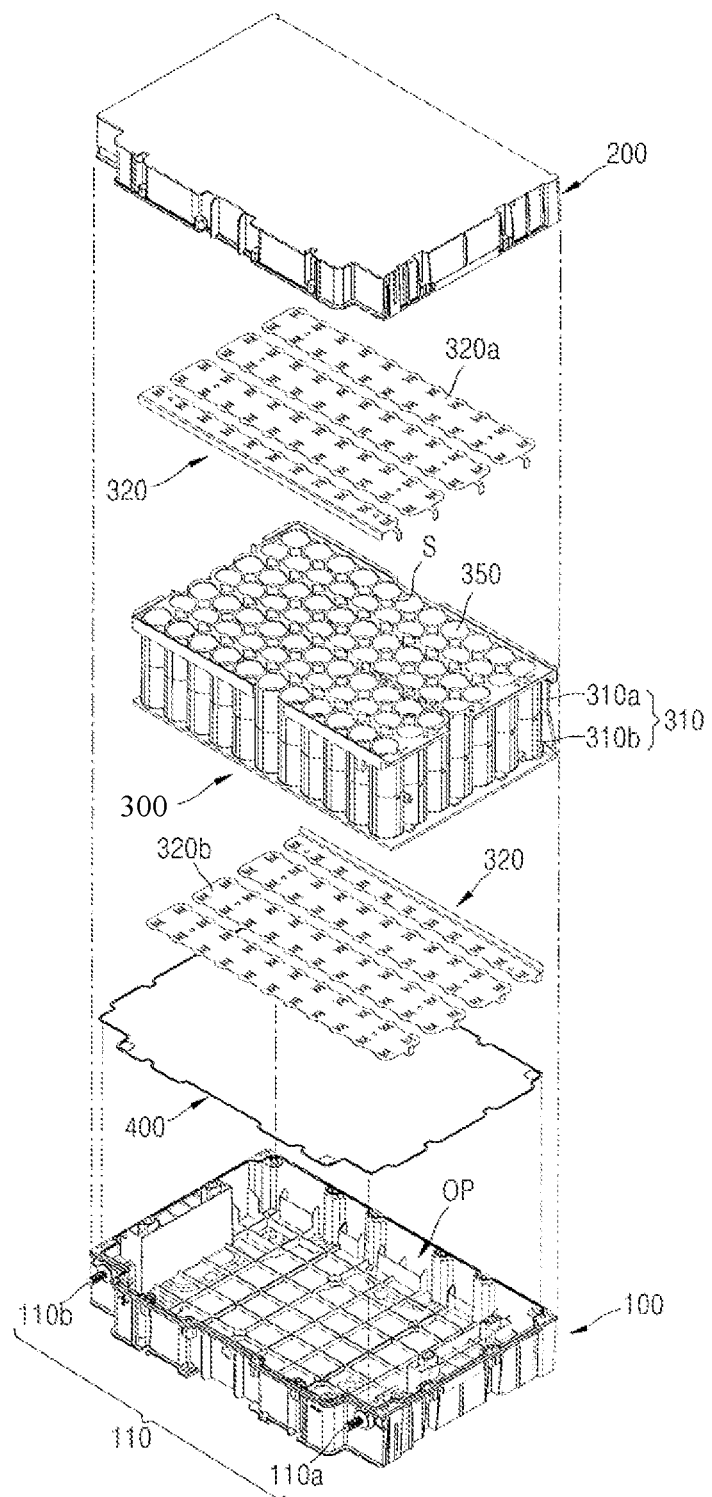
FIG. 2 is an exploded perspective view schematically illustrating the battery pack of FIG. 1.

FIG. 1 is a perspective view schematically illustrating a battery pack according to an embodiment of the present disclosure, and FIG. 2 is an exploded perspective view schematically illustrating the battery pack of FIG. 1.

Referring to FIGS. 1 and 2, a battery pack according to an embodiment of the present disclosure may include a lower case 100 having a space therein and having a groove portion 150 formed to extend along a certain width of an outer top surface, an upper case 200 arranged on the lower case 100, a battery unit 300 arranged in an internal space of the lower case 100, and a sealing member 400 inserted into the groove portion 150 and located between the upper case 200 and the lower case 100.

The lower case 100 may be arranged in a rectangular frame form to have a space therein to accommodate the battery unit 300. The upper case 200 may be arranged on the lower case 100 to face the lower case 100. The battery unit 300 accommodated in the internal space of the lower case 100 may be completely accommodated by the lower case 100, or a portion of the battery unit 300 may protrude above the lower case 100, as illustrated in FIGS. 1 and 2. In the present embodiment, as a portion of the battery unit 300 protrudes above the lower case 100, the upper case 200 may also be arranged in a rectangular frame shape having a space therein like the lower case 100. In another embodiment, when the battery unit 300 is completely accommodated in the lower case 100, the upper case 200 may be arranged in a rectangular flat shape.

An external terminal 110 may be arranged at the lower case 100. The external terminal 110 may be electrically connected to a plurality of battery cells 350 built in the battery pack. Although not illustrated, in some cases, a bus bar (not illustrated) may be connected to the external terminal 110, and the external terminal 110 may be connected to the electrodes of a plurality of battery cells 350 connected to a lead plate 320 through the bus bar. The external terminal 110 may include first and second external terminals 110a and 110b that have different polarities. For example, in the present embodiment, the first external terminal 110a may have a positive polarity, and the second external terminal 110b may have a negative polarity. In this case, the first external terminal 110a may be electrically connected to a first lead plate 320a, and the second external terminal 110b may be electrically connected to a second lead plate 320b. As such, the first and second external terminals 110a and 110b may be electrically connected to the first and second lead plates 320a and 320b connected to the electrodes of one end and the other end of a plurality of battery cells 350.

Meanwhile, in the present embodiment, a sealing member 400 may be located between the lower case 100 and the upper case 200. The sealing member 400 may be inserted into the groove portion 150 formed to extend along a certain width of the outer top surface of the lower case 100. The sealing member 400 will be described below in detail with reference to FIGS. 3 to 6.

Referring to FIG. 2, the battery unit 300 may include a plurality of battery cells 350, a cell holder 310 accommodating the plurality of battery cells 350, and a lead plate 320 formed to cover the electrodes of the plurality of battery cells 350 exposed from the cell holder 310.

The cell holder 310 may form a plurality of cell spaces S for accommodating a plurality of battery cells 350. For example, the cell holder 310 may form a plurality of cylindrical cell space S for accommodating a plurality of circular battery cells 350. The cell holder 310 may form a plurality of cell spaces S respectively corresponding to a plurality of battery cells 350. The cell holder 310 may include a pair of first and second cell holders 310a and 310b assembled in directions facing each other with a plurality of battery cells 350 therebetween.

For example, the cell holder 310 may include four sides to accommodate a matrix array of a plurality of battery cells 350 arranged in a column direction and a row direction. The lower case 100 may include a rectangular frame of four sides to accommodate the cell holder 310. However, in other embodiments, the arrangement of a plurality of battery cells 350 may be variously modified according to particular designs, and is not limited to the illustration.

The lead plate 320 may be formed to cover the electrodes of a plurality of battery cells 350 exposed from the cell holder 310 and, in some cases, may include a lead tab (not illustrated) extending from the lead plate 320. Different electrodes may be formed at both ends of a plurality of battery cells 350, and the electrodes of the plurality of battery cells 350 may be exposed from the first and second cell holders 310*a* and 310*b*. The exposed electrodes of the plurality of battery cells 350 may be electrically connected to each other through the lead plate 320, and the plurality of battery cells 350 may be electrically connected to each other in series, in parallel, or in series/parallel through the lead plate 320 to provide an output matching a desired electrical output.

The lead plate 320 may include a first lead plate 320*a* arranged on a top surface of the cell holder 310 and a second lead plate 320*b* arranged on a bottom surface of the cell holder 310. More particularly, the first lead plate 320*a* may be arranged on the outside of the first cell holder 310*a*, that is, a top surface of the first cell holder 310*a*, and the second lead plate 320*b* may be arranged on the outside of the second cell holder 310*b*, that is, a bottom surface of the second cell holder 310*b*.

The first lead plate 320*a* may be arranged to cover the electrodes of one end of the plurality of battery cells 350 exposed from the first cell holder 310*a*, and the second lead plate 320*b* may be arranged to cover the electrodes of the other end of the plurality of battery cells 350 exposed from the second cell holder 310*b*. For example, the first lead plate 320*a* may connect the electrodes of one end of the battery cells exposed from the first cell holder 310*a*, and the second lead plate 320*b* may connect the electrodes of the other end of the battery cells exposed from the second cell holder 310*b*. The first and second lead plates 320*a* and 320*b* may alternately connect the electrodes of one end and the other end of the battery cells exposed from the first and second cell holders 310*a* and 310*b*, thereby connecting the battery cells of adjacent columns in series.

In the present disclosure, a plurality of battery cells built in the battery pack may be connected in series, in parallel, or in series/parallel according to a desired electrical output, and may be variously modified without being limited to the illustration.

Figure 3:
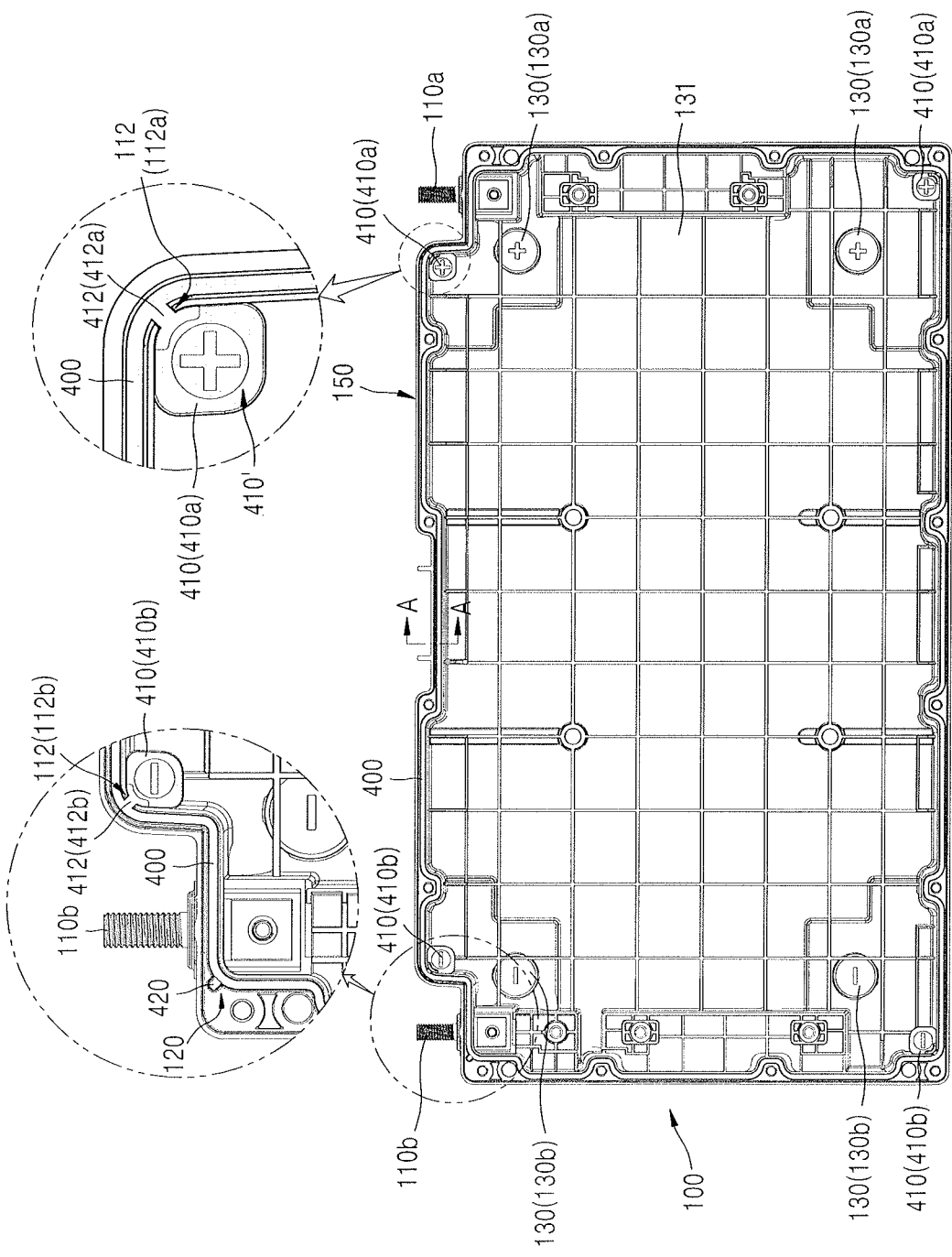
FIG. 3 is a plan view schematically illustrating a lower case of the battery pack of FIG. 1.
Figure 4:
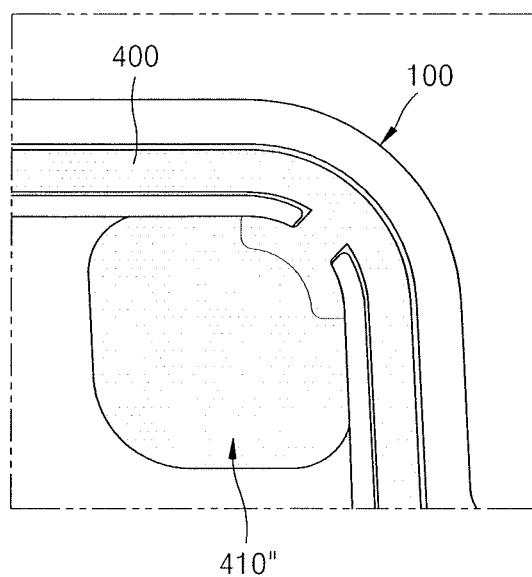
FIG. 4 is a rear view schematically illustrating a portion of a sealing member of the battery pack of FIG. 1.

FIG. 3 is a plan view schematically illustrating the lower case 100 of the battery pack of FIG. 1, and FIG. 4 is a rear view schematically illustrating a portion of the sealing member 400 of the battery pack of FIG. 1.

Referring to FIG. 3, the battery pack according to the present embodiment may include a sealing member 400 inserted into the groove portion 150 and located between the upper case 200 and the lower case 100.

The sealing member 400 may be inserted into the groove portion 150 of the lower case 100, as illustrated in FIG. 3. The groove portion 150 may be formed as a closed loop to extend along a certain width of the outer top surface of the lower case 100. The sealing member 400 may be inserted into the groove portion 150 to pack the upper case 200 and the lower case 100, and thus the battery unit 300 accommodated in the upper and lower cases 100 and 200 may be sealed from the outside. The sealing member 400 may be formed of an elastic rubber material, for example, an o-ring.

The sealing member 400 may include a polarity indication tab 410 and a connection portion 412. The polarity indication tab 410 may be formed to extend from the sealing member 400 and may be connected to the sealing member 400 by the connection portion 412. Although the polarity indication tab 410 has been described above as being connected to the sealing member 400 by the connection portion 412, the polarity indication tab 410 may be substantially understood as extending from the sealing member 400 and thus the polarity indication tab 410 may be formed of the same material as the sealing member 400.

Referring to FIGS. 3 and 4 together, the polarity indication tab 410 may be arranged in a flat shape having one surface 410' and the other surface 410" opposite to one surface 410'. A polarity of + or − may be indicated on one surface 410' of the polarity indication tab 410. The polarity indication may be provided only on one surface 410' of the polarity indication tab 410. That is, as illustrated in FIG. 4, the polarity indication may not be provided on the other surface 410" of the polarity indication tab 410. This is to indicate the direction of inserting the sealing member 400 into the groove portion 150 of the lower case 100, which may prevent misassembly by guiding the inserting direction of the sealing member 400. Particularly, the sealing member 400 may be inserted into the groove portion 150 such that one surface 410' of the polarity indication tab 410 having a polarity indication may be the upper surface and the other surface 410" of the polarity indication tab 410 having no polarity indication may be the lower surface.

The polarity indication tab 410 may include a first polarity indication tab 410*a* and a second polarity indication tab 410*b*. The positive polarity may be indicated on the first polarity indication tab 410*a*, and the negative polarity may be indicated on the second polarity indication tab 410*b*. Although the sealing member 400 includes two first polarity indication tabs 410*a* and two second polarity indication tabs 410*b* in the present embodiment, the position and number of the first and second polarity indication tabs 410*a* and 410*b* may vary according to various embodiments when necessary.

The polarity indication tab 410 may be connected to the sealing member 400 by the connection portion 412 as described above. The groove portion 150 of the lower case 100 into which the sealing member 400 is inserted may have a fitting groove 112 opened to the internal space of the lower case 100. The polarity indication tab 410 may be fixed to the fitting groove 112 by inserting the connection portion 412 into the fitting groove 112.

The fitting groove 112 may include a first fitting groove 112*a* and a second fitting groove 112*b*. The first polarity indication tab 410*a* may be fixed to the first fitting groove 112*a*, and the second polarity indication tab 410*b* may be fixed to the second fitting groove 112*b*. Particularly, the first polarity indication tab 410*a* may be fixed to the first fitting groove 112*a* by inserting a first connection portion 412*a* into the first fitting groove 112*a*, and the second polarity indication tab 410*b* may be fixed to the second fitting groove 112*b* by inserting a second connection portion 412*b* into the second fitting groove 112*b*.

A polarity indication portion 130 may be formed at a bottom surface 131 of the internal space of the lower case 100 to indicate a direction in which the battery unit 300 is inserted. The polarity indication portion 130 may include a positive polarity indication portion 130*a* and a negative polarity indication portion 130*b*.

In the present embodiment, the positive polarity indication portion 130*a* may be located adjacent to the first external terminal 110*a*, and the negative polarity indication portion 130*b* may be located adjacent to the second external terminal 110*b*. The polarity indication portion 130 may be located adjacent to four corners of the bottom surface 131 of the lower case 100 formed as a rectangular frame. The polarity indication tab 410 may be arranged adjacent to the polarity indication portion 130, which may mean that the fitting groove 112 may be formed adjacent to the polarity indication portion 130. Thus, the fitting groove 112 may be formed at four corners of the lower case 100 formed of a rectangular frame, and the polarity indication tab 410 may be fixed to the fitting groove 112.

Meanwhile, the sealing member 400 may include a projection portion 420. The projection portion 420 may be arranged at a position of the sealing member 400 formed as a closed loop. A projection accommodating portion 120 for accommodating the projection portion 420 may be formed at the groove portion 150 of the lower case 100. The projection accommodating portion 120 may extend in a direction different from a direction in which the groove portion 150 extends. In FIG. 3 according to the present embodiment, the projection accommodating portion 120 extends in the outward direction of the groove portion 150; however, in another embodiment, the projection accommodating portion 120 may extend in the inward direction of the groove portion 150. The insertion direction of the sealing member 400 may be determined by the projection portion 420 and the projection accommodating portion 120, thereby facilitating assembly.

Figure 5:
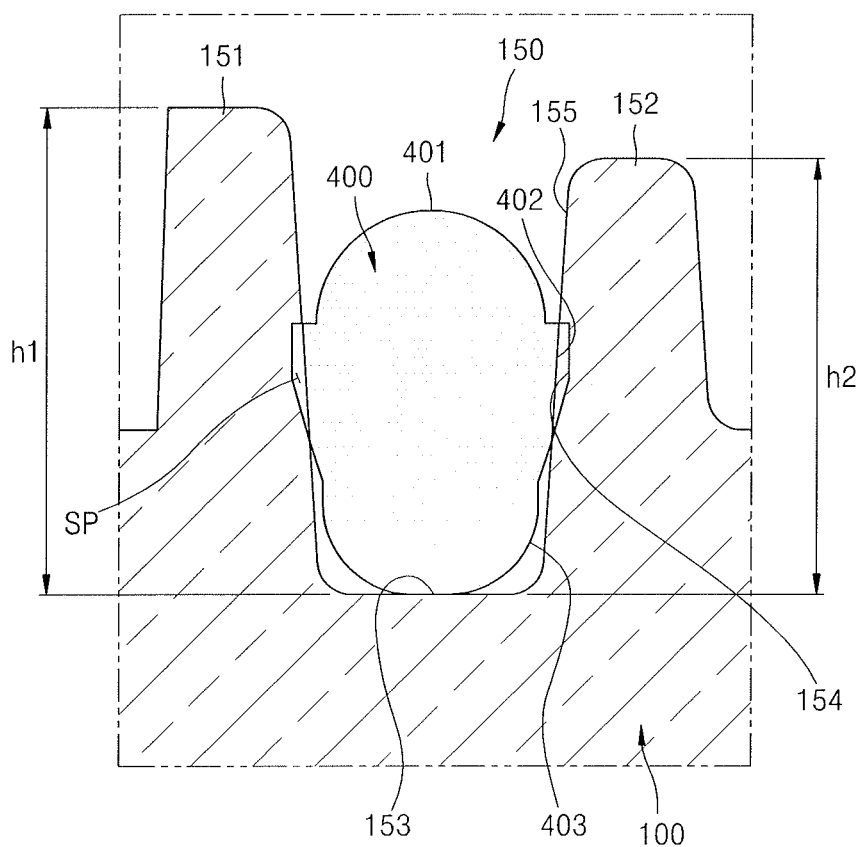
FIG. 5 is a cross-sectional view schematically illustrating a cross section taken along a line A-A of the battery pack of FIG. 3.
Figure 6:
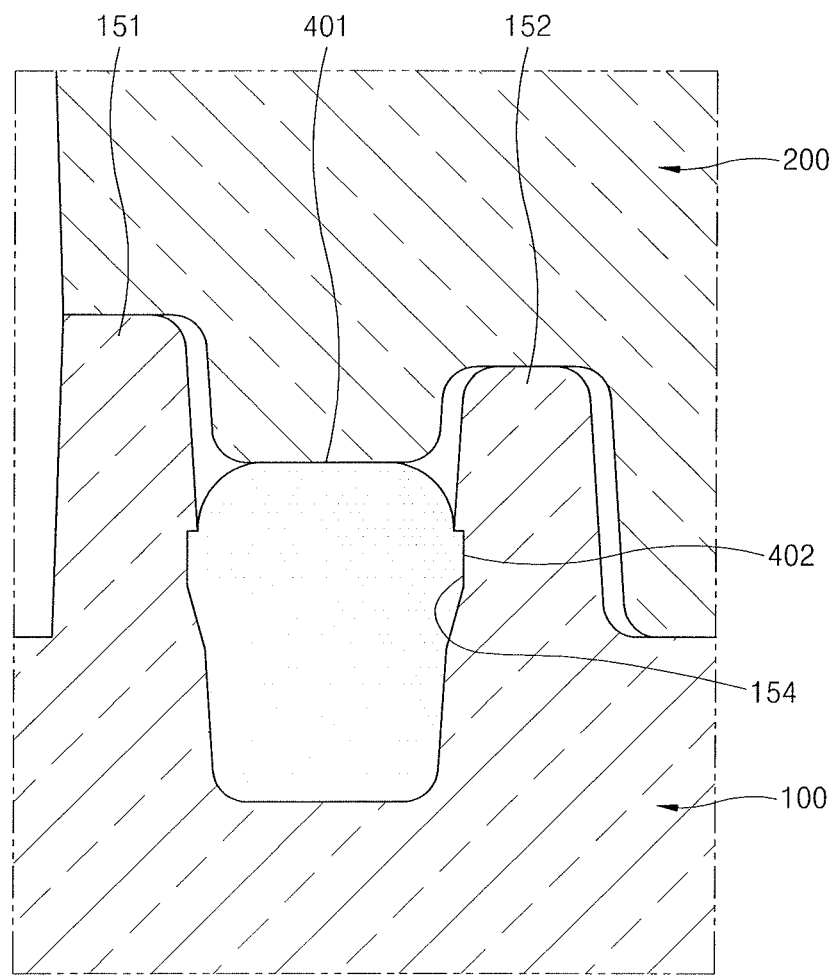
FIG. 6 is a cross-sectional view schematically illustrating a cross-section when an upper case is coupled in FIG. 5.

FIG. 5 is a cross-sectional view schematically illustrating a cross-section taken along a line A-A of the battery pack of FIG. 3, and FIG. 6 is a cross-sectional view schematically illustrating a cross-section when the upper case 200 is coupled in FIG. 5.

Referring to FIG. 5, a cross-sectional shape of the sealing member 400 according to the present embodiment may have an upper surface 401, a lower surface 403, and a side surface connecting the upper surface 401 to the lower surface 403. The upper surface 401 of the sealing member 400 may be formed as a curved surface convexed toward the upper case 200. As such, because the upper surface 401 of the sealing member 400 may be formed as a convex curved surface, the sealing member 400 may be pressed by the upper case 200 as illustrated in FIG. 6. The upper surface 401 of the sealing member 400 may be arranged to contact the upper case 200. The sealing force may be improved by the sealing member 400 pressed by the upper case 200.

A protrusion portion 402 forming a step with the upper surface 401 may be formed at the side surface of the sealing member 400. In the present embodiment, the protrusion portion 402 is formed at both sides of the cross-section of the sealing member 400; however, in another embodiment, the protrusion portion 402 may be formed only at one side of the cross-section of the sealing member 400. However, as described below, because the sealing member 400 functions to more stably couple the sealing member 400 to the groove portion 150 when the protrusion portion 402 is inserted into an insertion groove 154 of the groove portion 150, the protrusion portion 402 may be formed on both side surfaces of the cross-section of the sealing member 400.

The cross-section of the sealing member 400 may have a substantially elliptical shape. As described above, the upper surface 401 of the sealing member 400 may be formed as a curved surface convexed toward the upper case 200 and the upper surface 401 of the sealing member 400 may be pressed by the upper case 200, thereby further improving the sealing force of the sealing member 400. An end portion of the lower surface 403 of the sealing member 400 may be formed as a smooth curved surface to facilitate the insertion of the sealing member 400 into the groove portion 150. The end portion of the lower surface 403 of the sealing member 400 may not necessarily be formed as a smooth curved surface, but may be modified according to embodiments.

The width of the cross-sectional shape of the sealing member 400 may decrease gradually from the protrusion portion 402 toward the lower surface 403. That is, the width of a portion where the protrusion portion 402 is formed may be largest and the width thereof may decrease from the protrusion portion 402 toward the end portion of the lower surface 403 to form a substantially trapezoidal shape. This is to facilitate the insertion of the sealing member 400 into the groove portion 150.

Meanwhile, the groove portion 150 may be formed to extend along a certain width of the outer top surface of the lower case 100. As illustrated in FIG. 5, the groove portion 150 may include a first partition wall 151 located adjacent to the internal space of the lower case 100 and a second partition wall 152 located adjacent to the outside of the lower case 100. The width of the groove portion 150 may decrease gradually toward a bottom portion 153 of the groove portion 150.

In the present embodiment, a height h1 of the first partition wall 151 may be greater than a height h2 of the second partition wall 152 with respect to the bottom portion 153 of the groove portion 150. As such, because the height h1 of the first partition wall 151 located at the inner side is greater than the height h2 of the second partition wall 152, if the battery pack according to the present embodiment is exposed to moisture, it may be possible to further prevent water from penetrating into the battery unit 300 in addition to the sealing member 400 through the first partition wall 151 formed higher than the second partition wall 152.

Meanwhile, the insertion groove 154 may be formed at an inner surface 155 of the groove portion 150. The insertion groove 154 may be located corresponding to a position where the protrusion portion 402 of the sealing member 400 is formed. As illustrated in FIG. 5, when the upper case 200 is not coupled to the lower case 100, the protrusion portion 402 of the sealing member 400 may not be completely inserted into the insertion groove 154 of the groove portion 150. That is, the protrusion portion 402 and the insertion groove 154 are spaced apart from each other by a certain distance to form a space SP.

As illustrated in FIG. 6, when the upper case 200 is coupled to the lower case 100, the upper surface 401 of the sealing member 400 may be pressed by the upper case 200 and thus the shape of the sealing member 400 may change naturally. That is, the sealing member 400 with the upper surface 401 pressed by the upper case 200 is spread sideways by the pressure, and thus the protrusion portion 402 may be completely inserted into the insertion groove 154. Referring to FIG. 5, a space of a certain distance may be formed between the bottom surface of the groove portion 150 and the lower side of the sealing member 400, and the space may also be understood in the same context as described above.

As described above, because the protrusion portion 402 of the sealing member 400 may be inserted into the insertion groove 154 of the groove portion 150, the protrusion portion 402 of the insertion groove 154 may function as a hook to prevent the sealing member 400 from escaping from the groove portion 150 and simultaneously to improve the sealing force of the sealing member 400.

Although the present disclosure has been described with reference to the embodiments illustrated in the drawings, this is merely an example and those of ordinary skill in the art will understand that various modifications and other equivalent embodiments may be derived therefrom. Thus, the spirit and scope of the present disclosure should be defined by the technical spirit of the appended claims.

The invention claimed is:

1. A battery pack comprising: a lower case having an internal space therein, the lower case including a groove portion extending along a certain width of an outer top surface of the lower case; an upper case arranged on the lower case; a battery unit accommodated in the internal space of the lower case and including a plurality of battery cells; and a sealing member inserted into the groove portion to be located between the upper case and the lower case, wherein a cross-sectional shape of the sealing member includes an upper surface, a lower surface, and a side surface connecting the upper surface to the lower surface, the upper surface being a curved surface convexed toward the upper case, and wherein the sealing member includes a protrusion portion on the side surface, a top surface of the protrusion portion facing the upper case and being at a lower level than the upper surface of the sealing member, such that the top surface of the protrusion portion defines a step relative to the upper surface of the sealing member;

a polarity indication tab; and a connection portion connecting the polarity indication tab to the sealing member; and wherein the polarity indication tab has a first surface and a second surface opposite to the first surface, a polarity being indicated only on the first surface.

2. The battery pack of claim 1, wherein the lower case further includes an insertion groove on an inner surface of the groove portion, the insertion groove corresponding to the protrusion portion of the sealing member.

3. The battery pack of claim 2, wherein the upper surface of the sealing member is pressed by the upper case to contact the upper case.

4. The battery pack of claim 3, wherein, when the upper case presses the sealing member, the protrusion portion of the sealing member is coupled to the insertion groove of the groove portion.

5. The battery pack of claim 1, wherein a width of the cross-sectional shape of the sealing member decreases gradually from the protrusion portion toward the lower surface.

6. The battery pack of claim 1, wherein the groove portion has a fitting groove opened to the internal space of the lower case, the connection portion extending from the polarity indication tab to the sealing member through the fitting groove.

7. The battery pack of claim 6, wherein the fitting groove includes a first fitting groove and a second fitting groove, the polarity indication tab includes a first polarity indication tab and a second polarity indication tab that have different polarities, the first polarity indication tab is fixed to the first fitting groove, and the second polarity indication tab is fixed to the second fitting groove.

8. The battery pack of claim 7, wherein the sealing member further includes a projection portion.

9. The battery pack of claim 8, wherein the groove portion further includes a projection accommodating portion for accommodating the projection portion.

10. The battery pack of claim 8, wherein the projection portion is located adjacent to the second polarity indication tab.

11. The battery pack of claim 1, wherein the sealing member has a closed-loop shape.

12. The battery pack of claim 1, wherein the groove portion includes:

a first partition wall located adjacent to the internal space of the lower case; and a second partition wall located adjacent to an outside of the lower case, the sealing member being between and contacting the first partition wall and the second partition wall, and a height of the first partition wall being greater than a height of the second partition wall with respect to a bottom portion of the groove portion.

13. The battery pack of claim 1, wherein a height of the sealing member is less than a depth of the groove portion, the groove portion extending above the sealing member.

14. The battery pack of claim 2, wherein the insertion groove is on an inner lateral surface of the groove portion, the insertion groove facing and overlapping the protrusion portion of the sealing member.

15. The battery pack of claim 14, wherein the groove portion includes:

a first partition wall adjacent to the internal space of the lower case; and a second partition wall adjacent to an outside of the lower case, the sealing member being between the first partition wall and the second partition wall, and the insertion groove being on at least one of the first partition wall and the second partition wall.

16. The battery pack of claim 3, wherein, when the upper case presses the sealing member, a portion of the insertion groove overlaps the top surface of the protrusion portion.

\* \* \* \* \*